J. J. SKAHEN.
CENTER BEARING FOR CAR TRUCKS.
APPLICATION FILED FEB. 13, 1908.
905,754.
Patented Dec. 1, 1908.
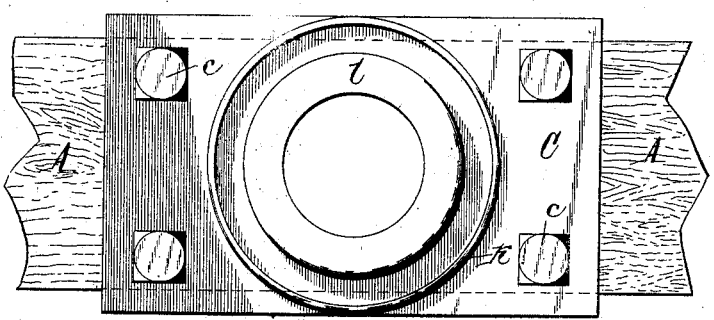
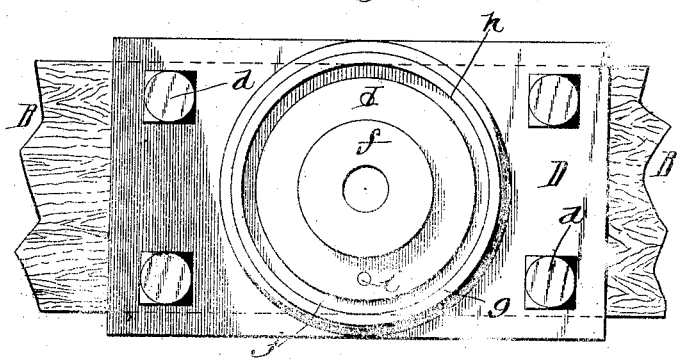
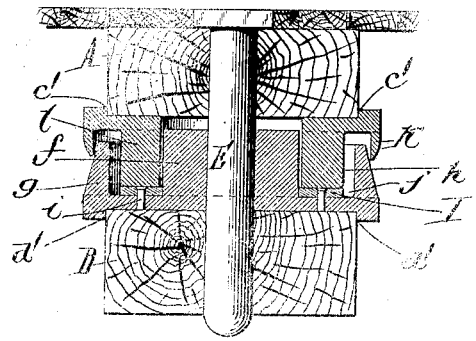
Witnesses:
Richard Sommer.
Gustav W. Sora.
James J. Skahen, Inventor
by Geyer & Popp
Attorneys.

UNITED STATES PATENT OFFICE.

JAMES J. SKAHEN, OF BUFFALO, NEW YORK, ASSIGNOR, BY DIRECT AND MESNE ASSIGNMENTS, OF THIRTY-FIVE ONE-HUNDREDTHS TO JOHN E. SHEEHAN, EIGHT ONE-HUNDREDTHS TO GEORGE H. CHARNOCK, AND TWO ONE-HUNDREDTHS TO MORRIS A. GRIFFIN, ALL OF BUFFALO, NEW YORK.

CENTER-BEARING FOR CAR-TRUCKS.

No. 905,754.    Specification of Letters Patent.    Patented Dec. 1, 19..

Application filed February 13, 1908. Serial No. 415,679.

*To all whom it may concern:*

Be it known that I, JAMES J. SKAHEN, a citizen of the United States, residing at Buffalo, in the county of Erie and State of New York, have invented a new and useful Improvement in Center-Bearings for Car-Trucks, of which the following is a specification.

This invention relates to the center bearings or plates interposed between the body and the trucks of railway cars, and more particularly street railway cars.

One of the objects of my invention is the construction of an efficient bearing of this kind which provides a comparatively large lubricant chamber and in which the contact area and consequent friction of the parts is reduced to a minimum.

A further object is to so construct the bearing that the part receiving the greatest wear can be readily replaced by a new one without requiring the renewal of the entire bearing.

An additional object is to render the bearing as dust-proof as possible and provide means for the collection of any dust or grit that may enter between the bearing surfaces, so as to lengthen the life of the bearing.

In the accompanying drawings:—Figure 1 is an inverted or bottom plan view of the upper plate of the center-bearing. Fig. 2 is a top plan view of its lower plate. Fig. 3 is a vertical central section of the assembled bearing and the body-bolster and truck-bolster.

Similar letters of reference indicate corresponding parts in the several views.

A indicates the body-bolster of a railway car and B the truck-bolster.

C indicates the upper or body plate of the center bearing, D the lower or truck plate and E the usual king-bolt or pin passing centrally through said plates and the body and truck-bolsters. These plates are secured to said bolsters by bolts $c$ and $d$ respectively, or other suitable means, and the two plates are preferably provided at their front and rear edges with stop-flanges or shoulders $c^1$ and $d^1$, respectively, which bear against the adjacent sides of the body and truck bolsters and resist twisting of the plates thereon, thereby relieving the bolts $c, d$ from undue strains.

The lower bearing plate D is provided centrally with a comparatively large stud $f$ of cylindrical form, and around this stud with an upwardly-projecting annular rim or flange $g$ which is separated from the stud by a comparatively wide and deep annular groove or socket $h$ adapted to receive a quantity of suitable lubricant such as heavy oil or grease. Surrounding said stud and resting upon the bottom of said groove is a removable wear ring I of hardened steel or other suitable material. This ring is narrower than the groove so as to leave a grit and dust-receiving space or auxiliary groove between one edge of the ring, preferably its outer edge, and the outer wall of the groove, as shown at $j$, in Fig. 3. The wear ring is held from rotation by stop-pins $i$ passing through it and entering holes in the body of the lower bearing plate D.

The upper bearing plate C is provided at its edge with a depending annular flange or guard $k$ which preferably overlaps the rim $g$ of the lower bearing plate and serves to exclude dust and grit from the bearing. Inside of this dust-guard the upper plate is provided with a depending hub $l$ which surrounds the stud $f$ of the lower bearing-plate D and rests at its lower edge upon the wear ring I. The diameter of this hub is considerably less than the width of the lubricant-groove $h$, so as to leave an ample space for the lubricant between the outer side of the hub and the rim $g$, as shown in Fig. 3. A small clearance, say of an eighth of an inch, is preferably left between the hub $l$ and the stud $f$ to allow the upper plate C to rock or tilt to a limited extent on the lower plate in following the rocking or tilting movements of the car body, and also to avoid friction between these parts. Clearance is also provided for between the upper end of said stud and the body-bolster to avoid friction at this point.

By this improved construction, while providing a sufficiently large lubricant chamber to keep the bearing oiled for a comparatively long period, the friction is reduced to a minimum, inasmuch as the wearing surfaces are practically confined to the bottom of the hub $l$ and the upper side of the wear-ring. As the ring is separate and removable from the lower plate D, it can be renewed when worn out without requiring the renewal of other parts of the bearing, thus greatly lengthening the life of the bearing. Any dust or grit working between the hub *l* and the wear ring drops into the auxiliary groove *j*, from which it may be removed from time to time, thus preventing unnecessary wear of said parts. So far as the function of this auxiliary groove is concerned, it is evident that the same result would be attained if the ring I were cast integral with the plate D.

I claim as my invention:—

1. A center bearing for car trucks, comprising an upper plate and a lower plate, the lower plate having a vertical stud and a raised rim surrounding the stud and separated therefrom by an intervening lubricant groove, and the upper plate having a depending hub surrounding said stud and extending into said groove, said hub being considerably smaller in diameter than the outer wall of the groove, leaving a lubricant space between said parts, substantially as set forth.

2. A center bearing for car trucks, comprising a lower plate having a vertical stud and a raised rim surrounding the stud and separated therefrom by an intervening lubricant groove, a removable wear-ring seated in said groove, and an upper plate having a depending hub surrounding said stud and resting upon said wear-ring, substantially as set forth.

3. A center bearing for car trucks, comprising a lower plate having a vertical stud and a raised rim surrounding the stud and separated therefrom by an intervening lubricant groove, a removable wear-ring seated in said groove, means for holding said ring from rotation, and an upper plate having a depending hub surrounding said stud and resting upon said wear-ring, substantially as set forth.

4. A center bearing for car trucks, comprising a lower plate having a vertical stud and a raised rim surrounding the stud and separated therefrom by an intervening lubricant groove, a removable wear-ring seated in said groove, and an upper plate having a depending hub surrounding said stud and resting upon said wear-ring, said hub being considerably smaller in diameter than the outer wall of said groove, leaving a lubricant space between said parts, substantially as set forth.

5. A center bearing for car trucks, comprising a lower plate having a vertical stud and a raised rim surrounding the stud and separated therefrom by an intervening lubricant groove, a removable wear-ring seated in said groove, and an upper plate having a depending hub surrounding said stud and resting upon said wear-ring, the thickness of said hub being considerably less than the width of said groove and the inner and outer surfaces of the hub being separated from said stud and said rim by intervening spaces, substantially as set forth.

6. A center bearing for car trucks, comprising an upper plate and a lower plate, the lower plate having a vertical stud and a raised rim surrounding the stud and separated therefrom by an intervening lubricant groove, said groove being provided in its bottom with an auxiliary dust-receiving groove, and the upper plate having a depending hub surrounding said stud and extending into said main groove, substantially as set forth.

7. A center bearing for car trucks, comprising a lower plate having a vertical stud and a raised rim surrounding the stud and separated therefrom by an intervening lubricant groove, a removable wear-ring seated in said groove and narrower than the same, leaving an auxiliary dust-receiving groove between the edge of the ring and one of the walls of said main groove, and an upper plate having a depending hub surrounding said stud and resting upon said wear-ring, substantially as set forth.

Witness my hand this 8th day of February, 1908.

JAMES J. SKAHEN.

Witnesses:
GEORGE H. CHARNOCK,
C. F. GEYER.